US006968175B2

(12) United States Patent
Raivisto et al.

(10) Patent No.: US 6,968,175 B2
(45) Date of Patent: Nov. 22, 2005

(54) METHOD AND SYSTEM FOR SHARING TRANSMISSION REVENUE BETWEEN MOBILE OPERATORS AND CONTENT PROVIDERS

(75) Inventors: Tommi Raivisto, Vantaa (FI); Patrik Gustafsson, Foster City, CA (US)

(73) Assignee: Nokia Corporation, Espoo (FI)

( * ) Notice: Subject to any disclaimer, the term of this patent is extended or adjusted under 35 U.S.C. 154(b) by 408 days.

(21) Appl. No.: 10/218,020

(22) Filed: Aug. 13, 2002

(65) Prior Publication Data

US 2004/0033797 A1    Feb. 19, 2004

(51) Int. Cl.[7] ........................................... H04M 11/00
(52) U.S. Cl. .................. 455/406; 455/407; 455/408; 455/414.1; 705/40; 379/114.03; 379/114.22; 379/114.28
(58) Field of Search ........................ 455/405, 406, 455/407, 408, 414.1, 414.2, 423; 705/14, 705/26, 40, 65

(56) References Cited

U.S. PATENT DOCUMENTS

| 5,146,491 A | * | 9/1992 | Silver et al. | 379/114.24 |
|---|---|---|---|---|
| 5,481,534 A | * | 1/1996 | Beachy et al. | 370/259 |
| 5,590,197 A | * | 12/1996 | Chen et al. | 705/65 |
| 5,623,662 A | | 4/1997 | McIntosh | 395/619 |
| 5,819,092 A | | 10/1998 | Ferguson et al. | 395/701 |
| 5,826,241 A | * | 10/1998 | Stein et al. | 705/26 |
| 5,845,267 A | * | 12/1998 | Ronen | 705/40 |
| 6,035,281 A | * | 3/2000 | Crosskey et al. | 705/14 |
| 6,188,994 B1 | * | 2/2001 | Egendorf | 705/40 |
| 6,405,177 B1 | * | 6/2002 | DiMattina | 705/26 |

FOREIGN PATENT DOCUMENTS

WO          0159653         8/2001          G06F 17/60

* cited by examiner

Primary Examiner—Stephen D'Agosta
(74) Attorney, Agent, or Firm—Ware, Fressola, Van Der Sluys & Adolphson LLP

(57) ABSTRACT

A method and system for revenue sharing between mobile operators and content providers. The content providers, through a data network, provide data services to the end users of the mobile operators. For the data services, the content providers are paid by the mobile operators based on the revenue collected by the mobile operators from the end users using the services. An intermediate proxy is disposed between a mobile operator and the data network to keep track of the data amount transmitted by the content providers and the users and to keep track of the revenue sharing agreements established between that mobile operator and the content providers. Additionally, an intermediate proxy is linked to each content provider to keep track of the data amount transmitted to the end users via a mobile operator and to keep track of the revenue sharing agreement with that mobile operator.

3 Claims, 2 Drawing Sheets

METHOD AND SYSTEM FOR SHARING TRANSMISSION REVENUE BETWEEN MOBILE OPERATORS AND CONTENT PROVIDERS

FIELD OF THE INVENTION

The present invention generally relates to data services in a mobile network and, more specifically, to the revenue for data transmission in the mobile network.

BACKGROUND OF THE INVENTION

With the World Wide Web, a user of the Internet can access information and data through a service provider. In order to pay for the data services, the user typically pays a flat fee to the provider, regardless of the volume of data the user receives and how much traffic is transmitted.

Currently, it is also possible for an end user to use a mobile device such as a cell phone or a PDA (Personal Digital Assistant) to access the Internet for wireless data services. For example, such data services include browsing in the Internet web sites using the mobile device. In general, the mobile operator who provides the service gets revenue for the data transmitted in the mobile network. In the circuit-switched case, such as in a GSM (Global System for Mobile Communications) network, the operator typically charges the end user based on the time the data call is active. In the packet-switched case, such as in a GPRS (General Packet Radio Service) network, the operator typically charges the end user based on the number of transmitted packets.

In many cases, the content providers voluntarily make the requested data available to the end user for their own benefit. For example, a theater owner is likely to post the show time of various movies for the potential moviegoers. In this case, the content provider is not expected to generate revenue from providing the information or data. In other data services, such as certain law databases, the end users must pay a fee for data access.

When it comes to the revenue to a content provider who provides data services for the mobile network or for the fixed Internet, an end user of the mobile network is typically required to enter into a contract with each content provider. For example, the end user is required to subscribe to the services and authorize the content provider to charge the service usage to a credit card account.

Requiring a subscription from the end user for each service, particularly when performing manual entry of a user's name and charge account number, for example, would slow down the wide adoption of mobile services. This requirement adds inconvenience to the end user, and thus affects the number of end users who use the data services. Such data service procedures do not provide sufficient incentive to the content developers to innovate and implement new services.

Thus, it is advantageous and desirable to provide a method and mechanism for improving the procedure for paying the content providers who provide data services to the end users of a mobile device.

SUMMARY OF THE INVENTION

According to the first aspect of the present invention, there is provided a method of revenue sharing between a mobile operator and a content provider in a data network, wherein the content provider provides data services to an end user via a mobile network of the mobile operator who furnishes a data connection between the content provider and the end user, and wherein the mobile operator obtains a revenue from the end user for the data services provided by the content provider. The method is characterized by providing an agent between the mobile network and the data network for collecting information indicative of a data amount transmitted between the content provider and the end user, and by providing a mechanism for determining a payment amount to pay the content provider based on the revenue.

Advantageously, when the data transmission between the content provider and the end user is carried out in a packet-switched fashion, the agent is adapted to collect information indicative of the data transmitted by counting packets. The counting is based on an address of the content provider.

Advantageously, when the data transmission between the content provider and the end user is carried out in a circuit-switched fashion, the agent is adapted to collect information indicative of the data transmitted by counting packets in a pre-determined fashion. The counting is based on an address of the content provider.

Preferably, the payment amount to be paid to the content provider is a fixed percentage of the revenue collected from the end user by the mobile operator. Alternatively, the payment amount to be paid to the content provider is based on a formula agreed upon by the mobile operator and the content provider and on the revenue collected from the end user by the mobile operator.

Advantageously, the agent is adapted to provide the collected information to the mechanism at pre-configured intervals so as to allow the mechanism to determine the payment amount based on the collected information, and to keep track of a revenue sharing agreement with the content provider based on an address of the content provider so as to allow the mechanism to determine the payment amount based on the agreement.

Advantageously, a further agent is provided and linked to the content provider so as to allow the content provider to keep track of a revenue sharing agreement with the mobile operator based on an address of the mobile operator. The further agent can also be used for monitoring the data amount transmitted to the end user via the mobile operator, said further agent adapted to inform the content provider of the data amount.

Advantageously, if the mobile operator pays the content provider the payment amount at pre-configured intervals, the content provider has means to verify the payment amount based on the data amount.

Advantageously, if the content provider provides the mobile operator at pre-configured intervals an invoice for payment based on the data amount, the mechanism is adapted to verify the invoice.

According to the second aspect of the present invention, there is provided a system for revenue sharing between a mobile operator and a content provider in a data network, wherein the content provider provides data services to an end user via a mobile network of the mobile operator who furnishes a data connection between the content provider and the end user, and wherein the mobile operator obtains a revenue from the end user for the data services provided by the content provider. The system is characterized by an agent located between the mobile network and the data network for collecting information indicative of a data amount transmitted between the content provider and the end user, and by a mechanism for determining a payment amount to pay the content provider based on the revenue.

Advantageously, a further agent is provided and linked to the content provider so as to allow the content provider to keep track of a revenue sharing agreement with the mobile operator based on an address of the mobile operator. The further agent can also be used to monitor the data amount transmitted to the end user via the mobile operator, said further agent adapted to inform the content provider of the data amount.

BEST MODE TO CARRY OUT THE INVENTION

The method of revenue sharing between mobile operators and content providers, according to the present invention, uses an intermediate proxy that lies in the mobile operator's network logically between the mobile network and a data network, such as the Internet, for data traffic monitoring. The proxy, as used in the present invention, is a generic term that describes an intermediate agent which is capable of providing a communication link between two remote network elements for performing pre-configured functions for those network elements. This intermediate proxy is capable of keeping track of the agreements established between each mobile operator and the content providers and the data amount received from those content providers. The agreements can be monitored based on the IP (Internet Protocol) address or domain name of the content providers, for example. For data transmission in a packet-switched system, the data amount can be monitored by counting the number of packets transmitted (sent and received) based on the IP addresses of the peers, for example, between the end user and the content providers that have a revenue sharing agreement with the mobile operator. For data transmission in a circuit-switched system, the data amount can be monitored by the time duration of the active data call.

Figure 1:
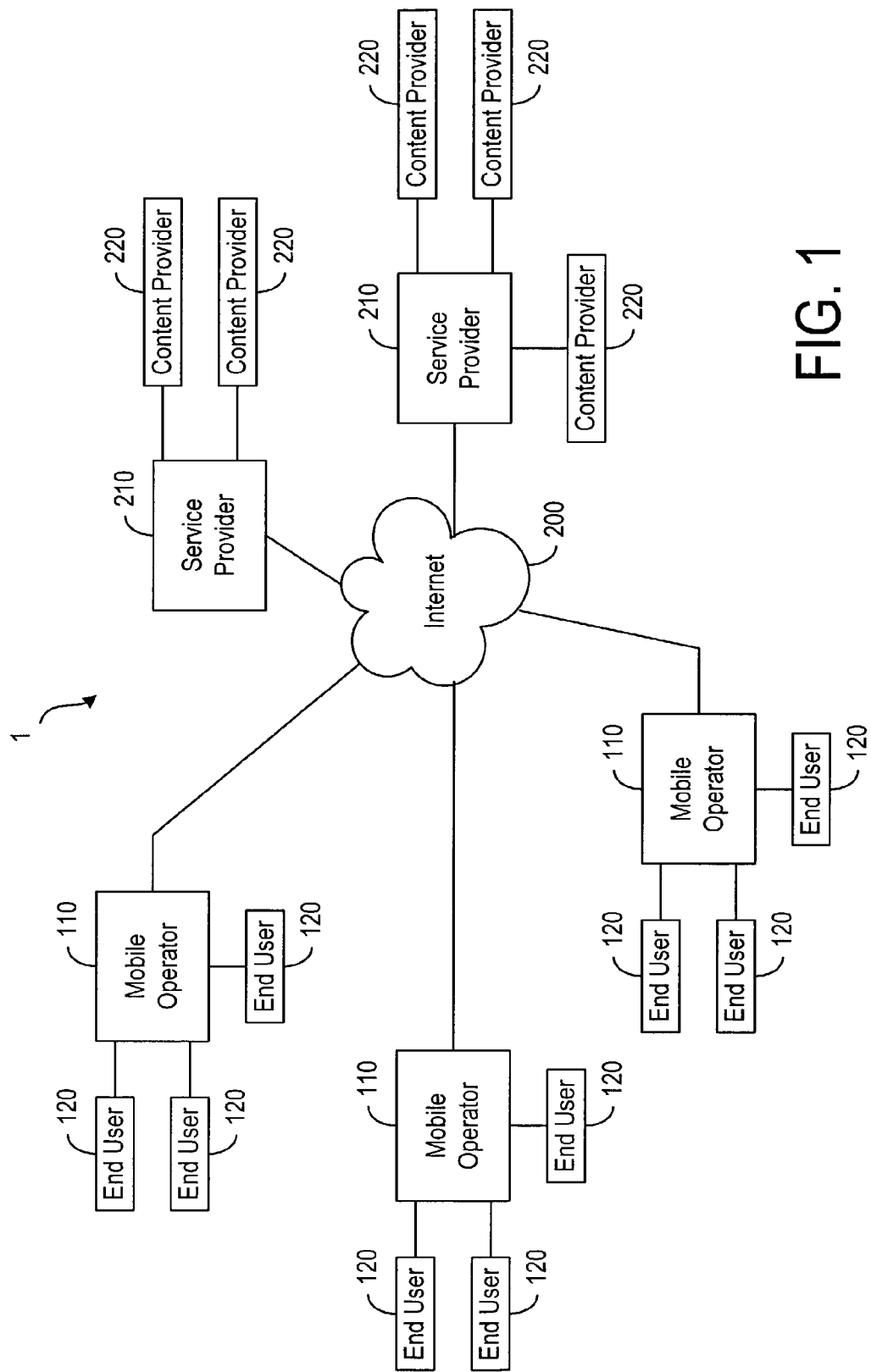
FIG. 1 is a block diagram showing the system or mechanism for sharing data transmission revenue between a mobile operator and a content provider, according to the present invention.
Figure 2:
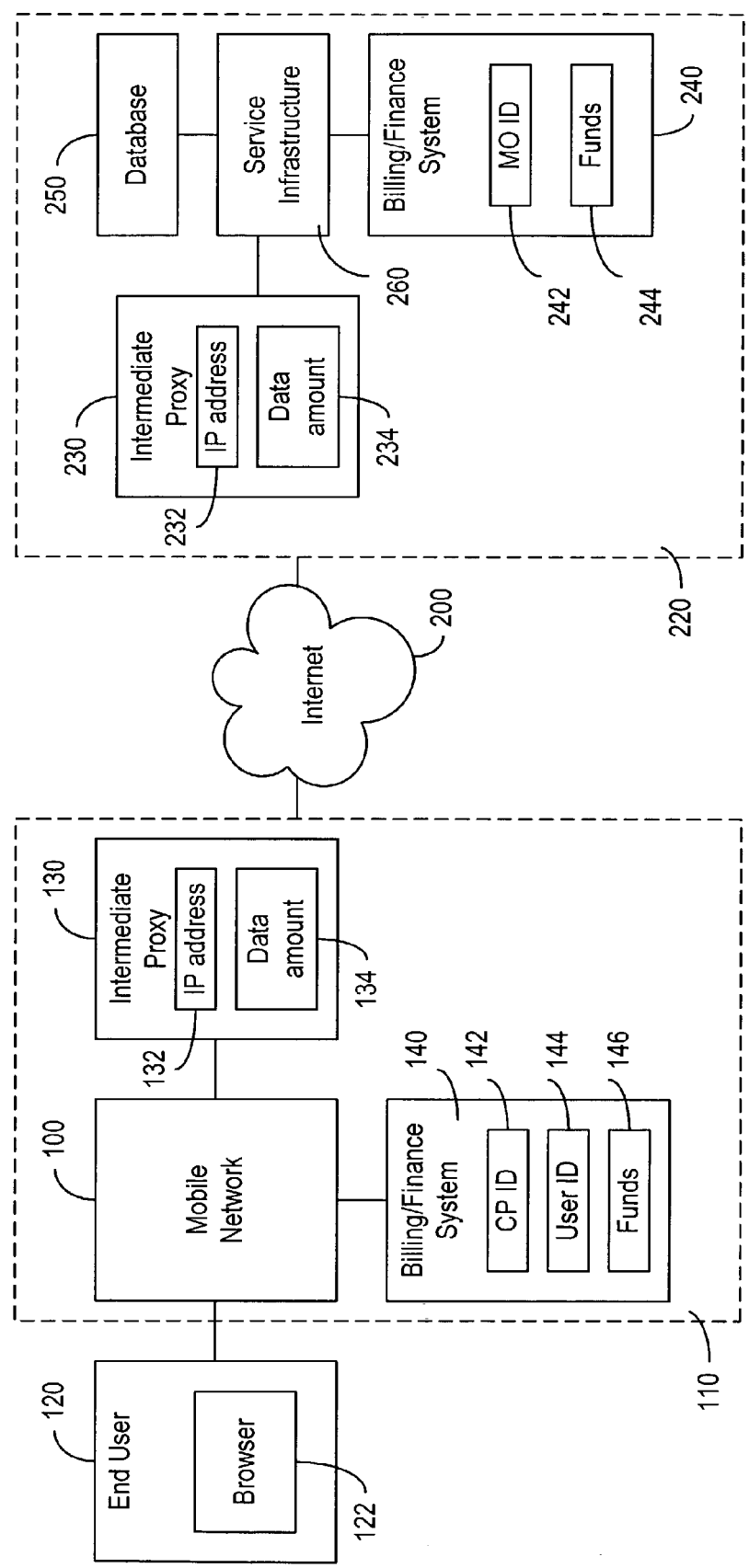
FIG. 2 is a block diagram showing the intermediate proxies and billing systems, according to the present invention.

The communications network 1, as shown in FIG. 1, comprises a plurality of mobile operators 110 for providing mobile services to a plurality of end users 120. The mobile operators 110 can be linked to a data network 200 so as to provide data services to the end users 120. As shown, a plurality of content providers 220 are linked to the data network 200 via a plurality of service providers 210 to provide such data services. As shown in FIG. 2, an intermediate proxy 130 is linked to a mobile network 100 in order to monitor the volume of data transmitted to the end users 120 from the content providers 220 who have a revenue sharing agreement with the mobile operator 110. The volume of data transmitted can be monitored by the intermediate proxy 130 either in the packet-switched system or in the circuit-switched system.

Advantageously, in order to use the data services provided by the content providers 220 through the mobile network 100, each user 120 is equipped with a browser 122 or some other user agent to view the provided contents. The intermediate proxy 130 includes the IP address or domain name 132 of each content provider 220 in order to keep track of the agreement with the content provider 220 on revenue sharing. The intermediate proxy 130 also includes a mechanism 134 to keep track of the data amount transmitted by those content providers 220. The mobile network 100, which is owned by the mobile operator 110, is linked to a billing and finance system 140. Advantageously, the billing and finance system 140 includes the identification or an address 142 of each content provider 220 and the identification or the account number 144 of each end user 120 who agrees to pay for data services. The billing and finance system 140 also has a mechanism 146 to keep track of the transmission revenue that the mobile operator 110 gets from the end users 120 for the data services provided by the content providers 220, and the amount of payment paid to each content provider 220. Preferably, the amount of payment to a content provider is proportional to the revenue the mobile provider generates when the end users use that content provider's services. The revenue sharing can be based on a fixed percentage, for example, 20 percent. However, the shared monetary amount can be based on a certain formula agreed upon by the mobile operator and the content provider. There can also be a minimum amount or a maximum amount that the mobile operator pays the content provider each time an end user uses the data services. For example, in the case of a circuit-switched case, the amount paid to content providers should not exceed what the operator charges the end user so that the agreed balance in the revenue sharing can be maintained. Furthermore, if a large number of packets are transmitted within a very short time, there should be a "limiting" feature in the intermediate proxy that, in the circuit-switched case, the intermediate proxy may not count all packets if these packets follow each other very rapidly, for example. For billing updating purposes, the intermediate proxy 130 provides the packet count at pre-configured intervals to the mobile operator's billing and finance system 140. The collected information in the billing and finance system 140 can be used to pay the content provider 220 based on the revenue the mobile operator 110 gets from the data services according to the agreed percentage or formula. The billing and finance system may also be used to ensure that the invoice coming from the content provider 220 is correct. Alternatively, the mobile operator 110 pays the content provider 220 automatically, regularly, or according to a term agreed upon by both parties without waiting for an invoice from the content provider. In that case, the content provider 220 may wish to ensure that the automatic payment amount is correct.

As shown in FIG. 2, the content provider 220 may comprise one or more databases 250 in order to provide the data requested by the end users 120. Advantageously, each content provider 220 comprises an intermediate proxy 230 in order to keep track of the agreements between the content provider 220 and the mobile operator 110, and of the data amount provided by the content provider 220 and transmitted via the mobile operator 110. The intermediate proxy 230 in the data network premises and the intermediate proxy 130 of the mobile network 100 can be complementary to each other. The agreements can be monitored based on the IP address or domain name of the mobile operator 110, for example. Thus, the intermediate proxy 230 includes the IP address or domain name 232 of each mobile operator 110 in order to keep track of the agreement with the mobile operator 110 on revenue sharing. The intermediate proxy 230 also includes a mechanism 234 to keep track of the volume of data transmitted between the content provider 220 and those operators 110 with which the content provider 220 has revenue sharing agreements. The content provider 220 comprises a content provider's service provisioning infrastructure 260 that provides the actual service. The infrastructure 260 is linked to a billing and finance system 240. At pre-configured intervals, the billing and finance system 240 receives from the intermediate proxy 230 the transmitted data amount as monitored by the mechanism 234. Based on the collected information, the billing and finance system 240 sends an invoice to the mobile operators, based on the IP address or domain name 242 of the mobile operators, according to the price per packet (or per active-call time) agreed upon with the mobile operators. The billing and finance system 240 has a mechanism 244 to verify that a payment paid by the mobile operator to the content provider is correct, in the case that the mobile operator 110 pays the content provider 220 automatically.

The present invention provides a mechanism for sharing revenue between a mobile operator and a content provider based on the volume of data transmitted from the content provider to an end user through the mobile operator. Based on TCP (Transmission Control Protocol) or UDP (User Datagram Protocol) port numbers in the data traffic, the data volume may be limited to certain services such as HTTP (HyperText Transfer Protocol) (port 80), or the revenue sharing can be service specific as agreed upon by the operator and the content provider. The system and method of revenue sharing, according to the present invention, can be implemented into GGSN (GPRS Gateway Service Node), Web proxies and WAP (Wireless Application Protocol) Gateway/Proxy, for example. With the present invention, the end user is not required to manually enter user information for data service subscriptions. Furthermore, the contracts/agreements and revenue sharing arrangements can be invisible to the end user as the fee for data transmission charged to the end user can remain unchanged. Because the amount paid by a mobile operator to a content provider is based on the revenue generated by the mobile operator, the content provider does not need to keep track of packets transmitted between the mobile operator and each individual end user. Furthermore, the present invention provides a mechanism to allow the mobile operator and the content developer to verify that the monetary transactions between the two parties are correct and substantially reflect the real use of data services.

Although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A method of revenue sharing between a mobile operator and a content provider in a data network, wherein the content provider provides data services to an end user via a mobile network of the mobile operator who furnishes a data connection between the content provider and the end user, and wherein the mobile operator obtains a revenue from the end user for the data services provided by the content provider, said method characterized by providing an agent between the mobile network and the data network for collecting information indicative of a data amount transmitted between the content provider and the end user, by providing a mechanism for determining a payment amount to pay the content provider based on the revenue, and by providing a further agent linked to the content provider so as to allow the content provider to keep track of a revenue sharing agreement with the mobile operator based on an address of the mobile operator, wherein the content provider provides the mobile operator at pre-configured intervals an invoice for payment based on the data amount, and the mechanism is adapted to verify the invoice, and wherein the data transmission between the content provider and the end user is carried out in a packet-switched fashion, and the agent is adapted to collect information indicative of the data amount transmitted by counting packets based on an address of the content provider, and wherein the agent is adapted to keep track of a revenue sharing agreement with the content provider based on an address of the content provider so as to allow the mechanism to determine the payment amount based on the agreement.

2. A system for revenue sharing between a mobile operator and a content provider in a data network, wherein the content provider provides data services to an end user via a mobile network of the mobile operator who furnishes a data connection between the content provider and the end user, and wherein the mobile operator obtains a revenue from the end user for the data services provided by the content provider, said system characterized by an agent located between the mobile network and the data network for collecting information indicative of a data amount transmitted between the content provider and the end user, by a mechanism for determining a payment amount to pay the content provider based on the revenue, and by a further agent linked to the content provider so as to allow the content provider to keep track of a revenue sharing agreement with the mobile operator based on an address of the mobile operator, and to provide the mobile operator at pre-configured intervals an invoice for payment based on the data amount, and the mechanism is adapted to verify the invoice, wherein the data transmission between the content provider and the end user is carried out in a packet-switched fashion, and the agent is adapted to collect information indicative of the data amount transmitted by counting packets based on an address of the content provider, and the agent is adapted to keep track of a revenue sharing agreement with the content provider based on an address of the content provider so as to allow the mechanism to determine the payment amount based on the agreement.

3. A device for use in a communication network, the communication network comprising a data network and a mobile network of a mobile operator to carry out revenue sharing between the mobile operator and a content provider in the data network, the mobile operator having an address, the content provider having an address, wherein the content provider provides data services to an end user via the mobile network, and the mobile operator furnishes a data connection between the content provider and the end user, and wherein the mobile operator obtains a revenue from the end user for the data services provided by the content provider, said device characterized by means for keeping track of an agreement between the mobile operator and the content provider on revenue sharing based on the address of the mobile operator and the address of the content provider; and means for collecting information indicative of a data amount transmitted between the content provider and the end user so as to allow the mobile operator to pay the content provider based on the revenue according to the agreement and to allow the content provider to provide the mobile operator at pre-configured intervals an invoice for payment based on the data amount, wherein the data transmission between the content provider and the end user is carried out in a packet-switched fashion, and the collecting means is adapted to collect information indicative of the data amount transmitted between the content provider and the end user by counting packets based on the address of the content provider.

* * * * *